UNITED STATES PATENT OFFICE.

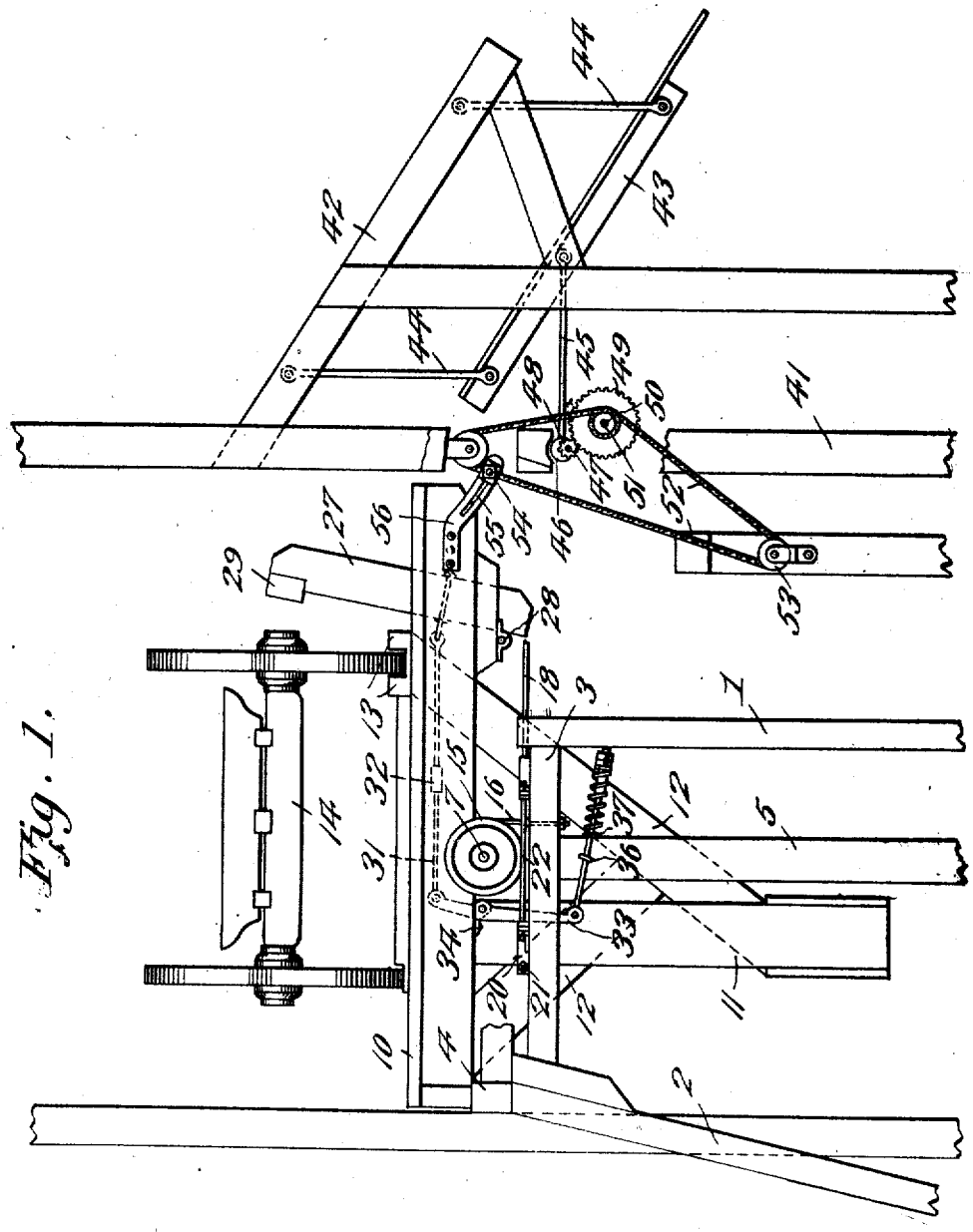

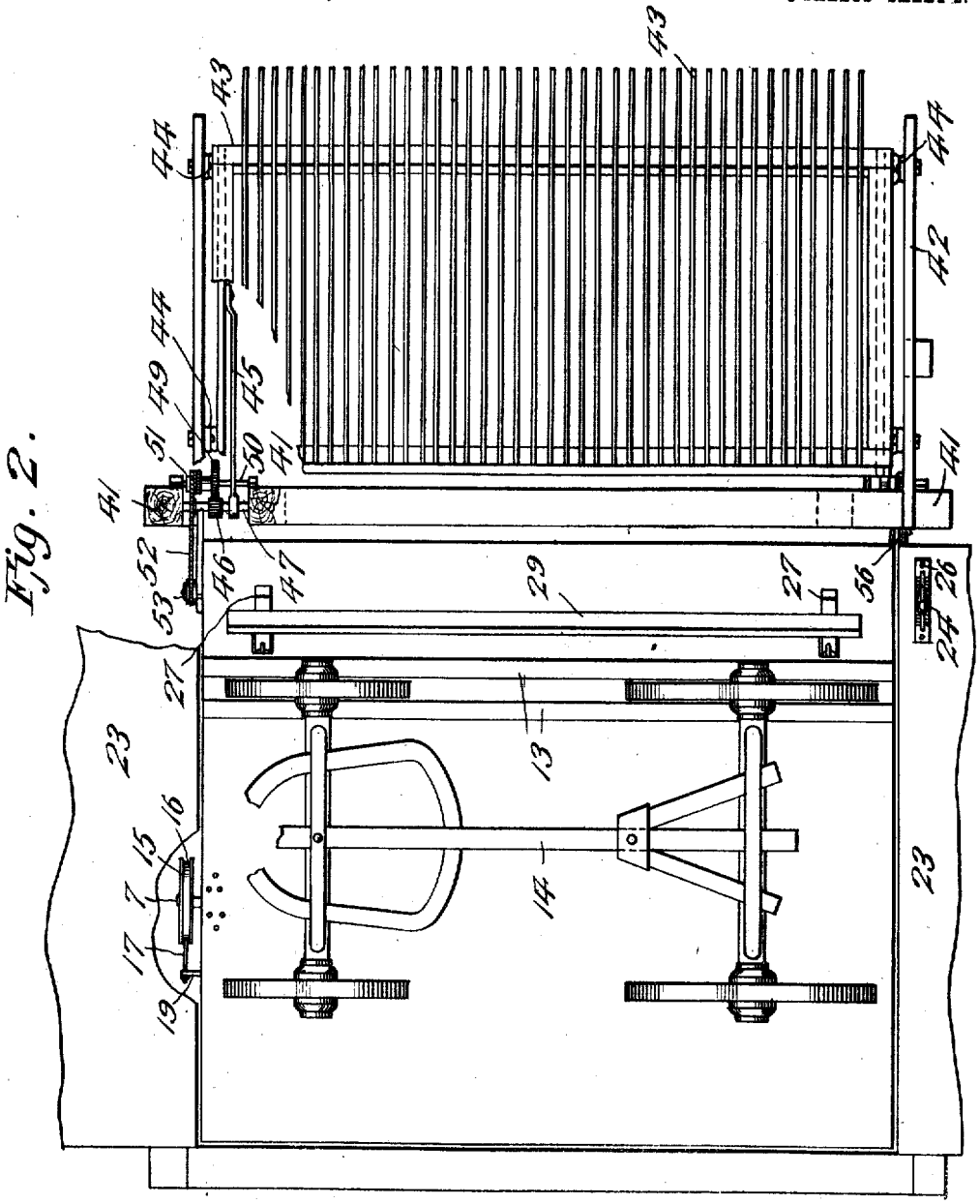

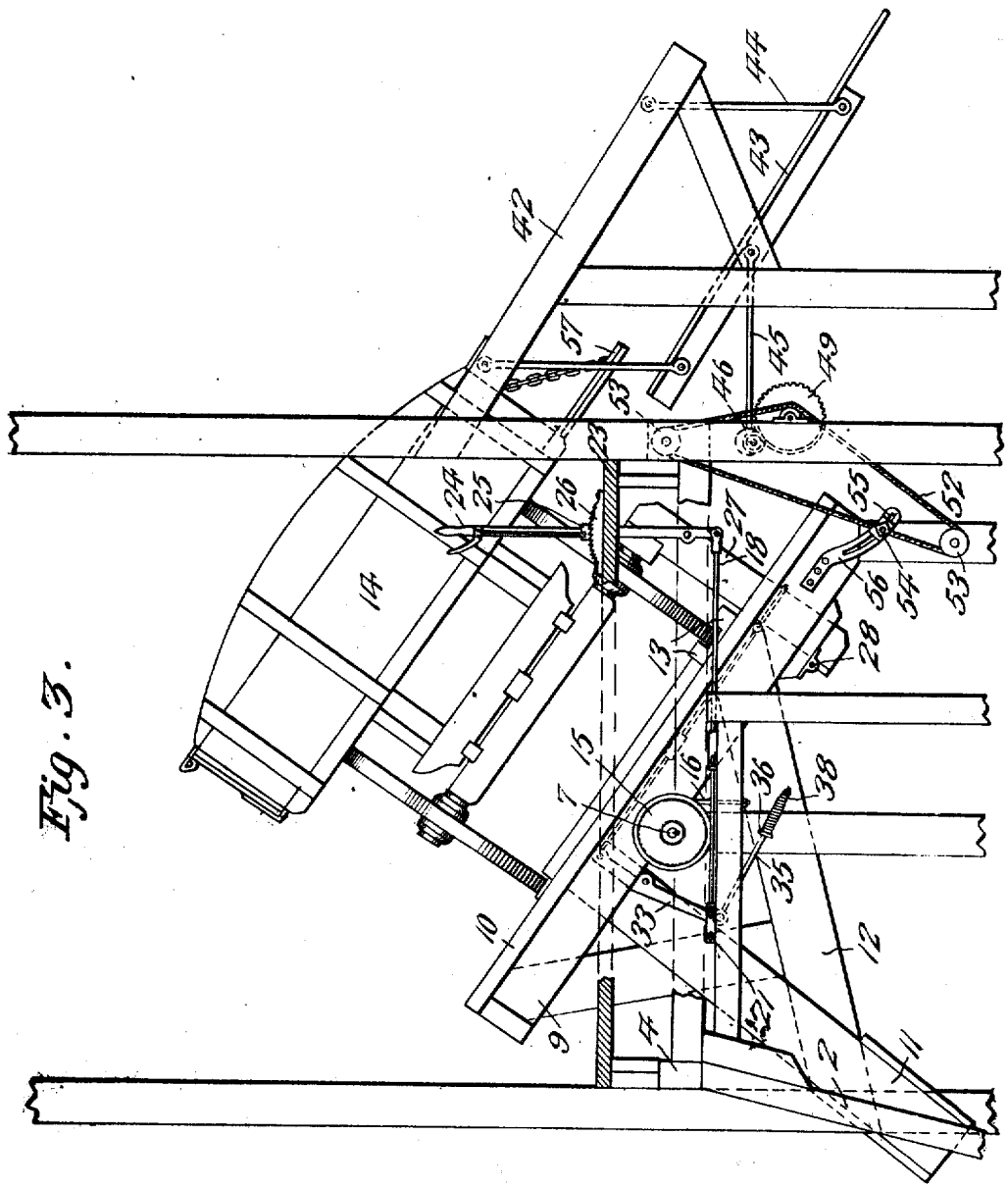

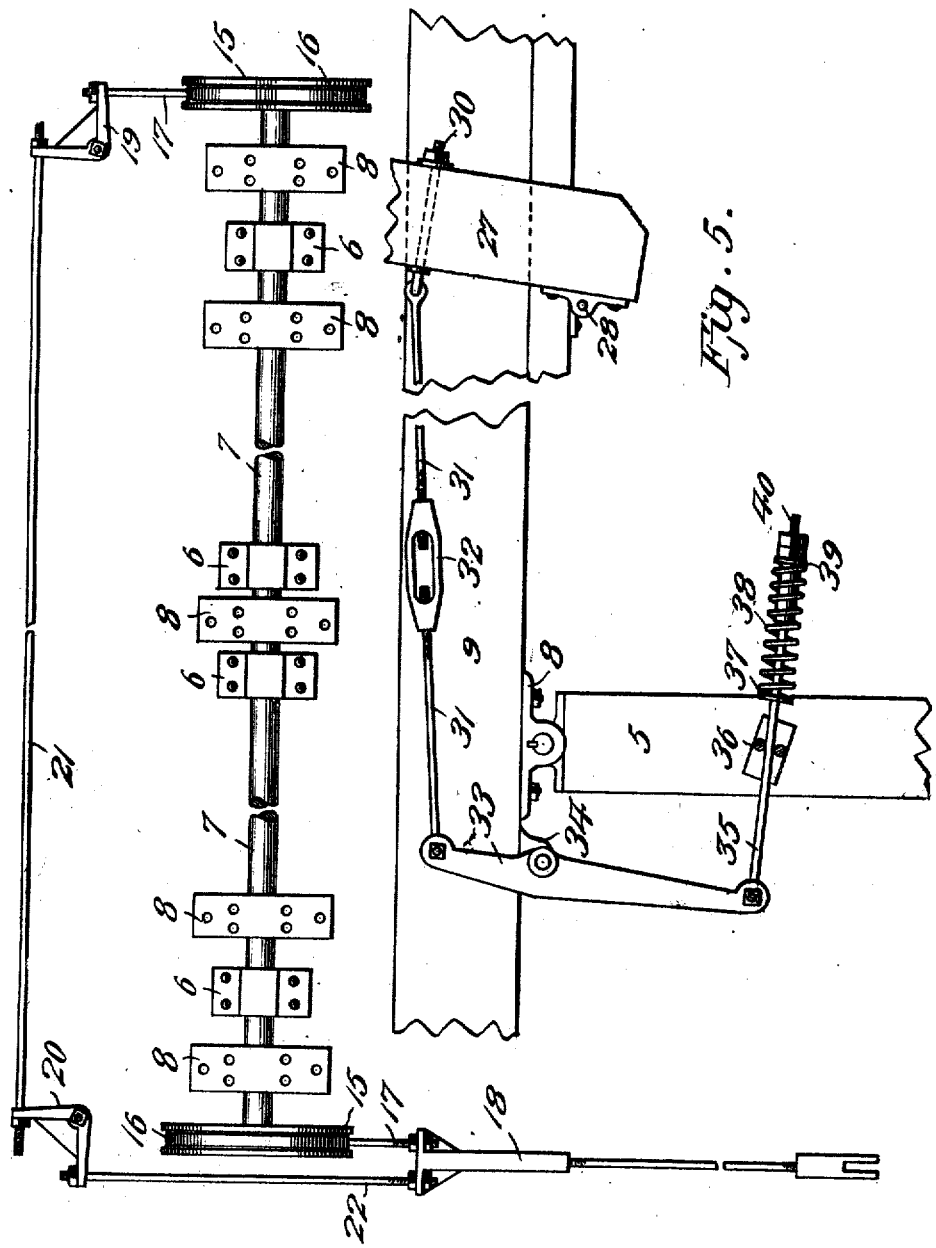

RALPH Z. McCOY, OF LOVELAND, COLORADO.

AUTOMATIC DUMPING APPARATUS.

No. 843,482.　　　　Specification of Letters Patent.　　　Patented Feb. 5, 1907.

Application filed August 17, 1906. Serial No. 331,076.

*To all whom it may concern:*

Be it known that I, RALPH Z. McCOY, a citizen of the United States, residing at Loveland, in the county of Larimer and State of Colorado, have invented new and useful Improvements in Automatic Dumping Apparatus, of which the following is a specification.

This invention relates to apparatus for dumping-vehicles; and its object is to provide mechanism which can be controlled by a single operator for holding a vehicle thereon, for dumping the vehicle, and for returning the vehicle to its initial position.

A further object is to provide means whereby the operator can control the dumping of the vehicle.

A still further object is to so place the controlling-lever that the operator using it is in a position to quickly let down the side of the vehicle, the entire dumping operation being at all times within full view of the operator.

A still further object is to provide a shaking chute or screen actuated by the platform to remove the earth from the dumped material—for instance, beets, potatoes, and the like.

With the above and other objects in view the invention embraces a platform, which is mounted off center upon a shaft extending longitudinally thereunder and constituting a pivot therefor. A counterbalance is suspended from the platform, and serves to hold the same normally in a horizontal position. Guide-strips are disposed on the platform and a vehicle is adapted to be moved into position with the wheels at one side between the guide-strips. Holding-blocks are movably mounted upon the platform and are adapted to automatically swing against the hub of the wheels, so as to prevent the vehicle from overturning during the dumping operation, this movement of the holding-blocks being automatic. The tilting of the platform is controlled by brakes operated from a single lever, and these brakes are adapted to normally hold the platform against movement and until a loaded vehicle has been placed upon the platform. When the brakes are then released, the weight of the vehicle will cause the platform to tilt and the contents of the vehicle will be discharged upon a screen or other guiding means, which is adapted to be actuated by the operation of the platform. The brake serves to hold the platform while tilted, and upon being released the counterbalance will return the platform and the empty vehicle to normal position.

The invention also consists of certain other novel features of construction and combinations of parts, which will hereinafter be more fully described, and pointed out in the claims.

In the accompanying drawings is shown the preferred form of the invention.

In said drawings, Figure 1 is a view, partly in end elevation and partly in section, of the apparatus, showing the parts in their normal positions, a portion of the wagon being shown upon the platform. Fig. 2 is a plan vew of the apparatus, one portion thereof being broken away to show the screen-actuating mechanism. Fig. 3 is an end elevation of the complete apparatus, showing the platform tilted and a wagon in position thereon. Fig. 4 is a detail view of the pivot-shaft and the brakes, and Fig. 5 is an enlarged elevation of the actuating mechanism of the holding-blocks.

Referring to the figures by characters of reference, a frame is provided comprising uprights 1 and 2, connected by cross-beams 3 and having a stop-beam 4 adjacent the upper ends of the uprights 2. Standards 5 are disposed within the frame 1 and carry bearing-boxes 6, in which is journaled a shaft 7. Boxes 8 are keyed upon this shaft and are secured to the cross joints or beams 9 of a platform 10, so that the shaft and platform are caused to move together. Shaft 7 is disposed to one side of the longitudinal center of the platform and a counterbalance 11 is suspended from the platform 10 at one side of the shaft 7, said counterbalance having suitable braces 12 and adapted to hold the platform 10 normally in a horizontal position. Parallel guide-strips 13 are arranged longitudinally on the platform and are adapted to receive between them the wheels at one side of a vehicle 14. When the vehicle is disposed in this manner, the same is off center, as clearly shown in Figs. 1 and 3, and if the vehicle be an ordinary one and empty, the counterbalance 11 will be sufficient to maintain the platform in its normal or horizontal position, even with the vehicle thereon. The balance 11 is of such a weight, however, as to be overbalanced by an ordinary vehicle, if loaded, and in order to prevent the platform from tilting when a loaded vehicle is placed in position thereon the shaft 7 is provided at each end with a brake-wheel 15. On each of these wheels is arranged a brake-band 16, one end of which is secured to the adjoining beam 3, while the other end has an arm 17 extending from it. One of these arms is connected to a rod 18, while the other one is secured to a bell-crank lever 19, connected to a similar lever 20 at the other end of the platform by means of a rod 18. A rod 22 connects bell-crank lever 20 with rod 21. An approach 23 is arranged at each end of the platform, so that a wagon can be moved upward onto said platform and as readily removed therefrom, and on one of these approaches close to the platform is fulcrumed a lever 24, the lower end of which is connected to the rod 18. This lever carries a dog 25, which is adapted to normally engage a rack 26, so as to lock the lever against movement. Obviously by throwing this lever in one direction the two brake-bands will be tightened on the wheels 15 and will prevent the platform from tilting, or if the platform has been tilted said lever can be manipulated to hold it in tilted position. By means of the brake the speed of downtilting motion of the platform and its return to normal position can be readily controlled.

Arms 27 extend through the platform near the strips 13 and are fulcrumed adjacent their lower ends, as shown at 28. These arms are connected by a holding-beam 29 and are provided with mechanism for automatically throwing the beam against the hubs of the wheels located between the guide-strips 13. The mechanism for operating both arms 27 is the same, and therefore a description of one will suffice for both. As shown particularly in Fig. 5, the arm 27 has an eyebolt 30 extending therethrough above its fulcrum, and this eyebolt is connected to a rod 31, made up of two parts connected by means of a turnbuckle 32. Rod 31 is pivoted to the upper end of a lever 33, fulcrumed upon a bracket 34, connected to one of the joists 9 of the platform 10, and a rod 35 is pivoted to the other end of the lever 33 and is slidably mounted in a ring 36, connected to one of the uprights 5. A stop-washer 37 is movably mounted on the rod 35, and a coiled spring 38 surrounds this rod and bears at one end on the washer, while its other end contacts with a head 39, adjustably mounted on the threaded end 40 of the rod 35. The arms 27, with the beam 29 thereon, normally rest by gravity in the positions shown in Figs. 1 and 5, and when so disposed washers 37 are out of contact with the rings 36, as shown in said figures.

Uprights 41 are disposed adjacent one side of the platform 10 and carry an inclined arm 42, from which a screen, chute, or guiding device for the discharging load 43 is suspended by means of links 44. This screen is connected by a rod 45 with an eccentric 46 on the shaft 47, which is journaled in the upright 41. A gear 48 rotates with this shaft and meshes with a larger gear 49, carried by a shaft 50. A drum 51 is secured to the shaft 50, and wound therearound is a cable 52, which runs over idlers 53 and has its ends connected to a slide 54. This slide is mounted to travel within a slot 55, formed in an arm 56, extending from the platform.

In using this apparatus a loaded wagon to be dumped is moved from one of the approaches 23 onto the platform and with the wheels of one side between guide-strips 13. The platform is of course first locked by means of the brake-bands 16, so that it cannot tilt unless the lever 24 is released by the operator. As soon as the wagon has assumed its proper position the operator standing upon the approach 23 close to the lever 24 lowers the side 57 of the vehicle 14. He then releases lever 24 gradually, and as the weight of the vehicle 14 is sufficient to overbalance the lever 11 the contents of the wagon will be slowly discharged upon the screen 43. When the platform tilts downward, the arm 56 draws the slide 54 therewith and causes the cable 52 to rotate drum 51. Motion will thus be transmitted from the gear 49 to gear 48 and shaft 47, and the eccentric 46 will rapidly oscillate the screen 43. When the platform first begins to tilt, the fulcrums of the levers 33 will be drawn away from the rings 36, and therefore the washers 37 will be moved against the rings. As the platform continues to tilt the fulcrums of levers 33 will move farther away from the ring 36, and therefore the spring 38 will be compressed and will pull on the lever and force the arms 27 toward the vehicle, thereby bringing the holding-beam 29 against the hubs of the adjoining wheels. The pressure of this beam against the hubs will increase in proportion to the incline of the platform, and said beam will prevent the vehicle from overturning while it is being dumped. As soon as the vehicle has been tilted as far as possible the shaft 7 is held against returning by applying the brake-bands 16 to the wheels 15. After the contents of the wagon have been dumped the brake-wheels 15 are released and the counterbalance 11, assisted by the tensioned springs 38, will promptly return the platform and the empty vehicle to their normal positions, and said vehicle can be drawn off the platform.

It will be seen that the counterbalance 11 is applied to the shorter "off" or ascending side of the platform, while coöperating means are provided for supporting the vehicle upon the platform in such manner that the weight of the load therein will be mainly thrown upon the longer "near" or descending side of the platform, whereby the preponderating weight of the load on the descending or dumping side is adapted to cause the platform as soon as released by the band-brake, to automatically tilt to dumping position. The arrangement of the counterweight is also such that its leverage or moment of resistance to the tilting of the platform increases in like ratio to the increase of the leverage of the load-weight in the swinging of the platform to dumping position. Hence it will be apparent that when the load is discharged the counterbalance will act to automatically return the platform and unloaded vehicle to normal position without the use of any assisting power, thus reducing the amount of attendant labor and simplifying the construction over prior appliances of this character. It will also be seen that by means of this apparatus the entire operation of dumping a wagon is under the absolute control of one person, who is in a position not only to manipulate the brakes, but also to unfasten the side of the vehicle.

In view of the compactness of the structure a considerable saving in lumber may be made, and in view of the fact that the entire mechanism is controlled by a single lever it is obvious that much time and labor is saved in operating the apparatus.

The preferred form of the invention has been set forth in the foregoing description; but I do not limit myself thereto, as I am aware that modifications may be made therein without departing from the spirit or sacrificing the advantages thereof, and I therefore reserve the right to make such changes as fairly fall within the scope of the claims.

What is claimed is—

1. The combination with a supporting-frame, and a shaft mounted to rotate therein, of a platform secured to and movable with the shaft, said shaft being disposed longitudinally on the platform and removed from the center thereof, and a counterbalance for holding the platform normally in a horizontal position.

2. The combination with a supporting-frame; of a shaft rotatably mounted thereon, a platform mounted off center upon the shaft and movable therewith, a counterbalance connected to the platform for holding the same normally horizontal, and means for locking the shaft against movement.

3. The combination with a supporting-frame; of a shaft rotatably mounted thereon, a platform mounted off center upon the shaft and movable therewith, a counterbalance connected to the platform for holding the same normally horizontal, brakes at the ends of the shaft, and means for simultaneously actuating the brakes.

4. The combination with a supporting-frame; of a shaft journaled thereon, a platform mounted off center upon, and movable with the shaft, a vehicle-holding device movably mounted upon the platform, and means operated by the tilting of the platform for swinging said device against a vehicle upon the platform.

5. The combination with a tiltable platform, and a vibratory screen-chute, of means operated by the tilting of the platform vibrating said screen-chute.

6. The combination with a tiltable platform, and a support therefor; of a vehicle-holding device movably mounted on the platform, and resilient means operated by the tilting of the platform for moving said device against a vehicle upon the platform.

7. The combination with a tiltable platform, and a support therefor; of wheel-guides upon the platform, a vehicle-holding device movably connected to the platform, means operated by the tilting of the platform for shifting the holding device against wheels within the guides, and a cushioning device carried by said means.

8. The combination with a tiltable platform and a support therefor; of a vehicle-engaging arm pivotally connected to the platform, a lever fulcrumed on the platform, a pivoted connection between the lever and arm, and a resilient retarding device connected to the lever and movably mounted upon the support.

9. The combination with a tiltable platform and a support therefor; of a vehicle-holding arm fulcrumed upon the platform, a lever fulcrumed on the platform adjacent the pivot thereof, a pivoted connection between the lever and arm, a rod extending from the lever and movably engaging the support and a cushion upon said rod.

10. The combination with a tiltable platform and a support therefor; of a vehicle-holding arm fulcrumed upon the platform, a lever fulcrumed upon said platform adjacent the pivot thereof, an adjustable pivoted connection between the arm and lever, a rod extending from the lever and movably engaging the support, and a cushioning-spring upon said rod and adapted to be compressed against the support when the platform is tilted.

11. The combination with a tiltable platform and a support therefor; of a suspended guiding device carried adjacent the platform, and means operated by the tilting of the platform for oscillating said device.

12. The combination with a tiltable platform, and a support therefor; of a guiding device suspended adjacent the platform, mechanism for oscillating said device, and means operated by the tilting of the platform for actuating said mechanism.

13. The combination with a tiltable platform, and a support therefor; of a suspended guiding device adjacent the platform, an eccentric for oscillating said device, a drum, means operated by the drum for rotating the eccentric, and a flexible connection between the drum and the platform for rotating said drum when the platform is tilted.

14. The combination with a tiltable platform, and a support therefor; of a vehicle-holding device movably connected to the platform, means operated by the tilting of the platform for swinging the holding device against the vehicle on the platform, and manually-operated means for controlling the tilting of the platform.

15. The combination with a support; of a platform mounted to tilt thereon, a counterbalance for holding the platform normally in a horizontal position, said counterbalance adapted to be overbalanced by a loaded vehicle upon the platform, and a manually-operated brake for controlling the tilting of the platform.

16. The combination with a support; of a shaft journaled thereon, a platform fixed to and movable with the shaft, a vehicle-holding arm fulcrumed upon the platform, a lever fulcrumed upon the platform, a pivotal connection between the holding-arm and the lever, a rod extending from the lever and movably engaging the support, a cushioning device upon the rod and adapted to bear against the support, and a brake upon the shaft for controlling the rotation thereof.

17. The combination with a support therefor; of a shaft journaled thereon, a platform fixed to and movable with the shaft, a vehicle-holding arm fulcrumed upon the platform, a lever fulcrumed upon the platform, a pivotal connection between the holding-arm and the lever, a rod extending from the lever and movably engaging the support, a cushioning device upon the rod and adapted to bear against the support, a brake upon the shaft for controlling the rotation thereof, a screen suspended adjacent the platform, and means operated by the tilting of the platform for oscillating the screen.

18. The combination with a supporting-frame, and a platform mounted to tilt thereon, of a vehicle-holding device movably mounted upon the platform, and a controlling connection between said holding device and the frame, whereby the holding device is automatically operated by the tilting of the platform.

19. The combination with a laterally-tiltable platform, and a support therefor; of a holding device movably mounted upon the descending side of the platform, and controlling connections between said holding device and the support, whereby the tilting movement of said platform will throw said holding device into engagement with the adjacent wheels of a vehicle supported upon the platform.

20. The combination with a laterally-tiltable platform, and a support therefor, of a guide upon the support, a holding device pivotally mounted upon the descending side of the platform, a lever mounted upon the platform and having one of its arms connected with the holding device, a rod connected with the other arm of the lever and movable through the guide, whereby in the tilting of the platform the lever will be operated to throw the holding device into action, and spring means associated with the rod for exerting a yielding resistance to the movement of said lever.

21. The combination with a laterally-tiltable platform, and a support therefor, of a pivotally-mounted vehicle-holding device upon the descending side of the platform, controlling connections between said holding device and support, whereby the tilting movement of the platform is caused to throw said support into action, and means for yieldingly opposing a cushioning resistance to the action of said connections.

22. In a dumping apparatus, the combination of an eccentrically-pivoted laterally-tilting platform, means for supporting a vehicle thereon so that the greater portion of the weight of the load will be on the longer or dumping side of the platform, and a counterweight acting on the shorter side of the platform and adapted to be overcome by the preponderance of the weight of the load to adapt the latter to automatically tilt the platform to dumping position, and serving upon the discharge of the load to restore the platform and vehicle to normal position.

23. In a dumping apparatus, the combination of a tilting platform adapted to tilt automatically under the weight of the load to be dumped, a counterweight for automatically restoring the platform to normal position after the discharge of the load, and braking means for controlling the tilting of the platform.

24. In a dumping apparatus, a laterally-tilting platform, means for counterbalancing the platform and automatically returning the same to normal position, means for supporting a vehicle upon the platform so that the weight of the load will cause the automatic tilting thereof to dumping position, means for controlling the tilting of the platform, vehicle-holding means, and means controlled by the tilting of the platform for automatically throwing said holding means into holding position.

25. In a dumping apparatus, the combination of a laterally-tilting platform, means for supporting a vehicle thereon so that the weight of the load therein will automatically tilt the platform, and a counterweight suspended from the ascending side of the platform, operating to normally maintain the platform in horizontal position and return the same to such position after the load is dumped.

26. In a dumping apparatus, the combination of a laterally-tilting platform, means for supporting a vehicle thereon so that the weight of the load therein will automatically tilt the platform, and a counterbalance suspended from the ascending side of the platform, said counterbalance being adapted to support the weight of the platform and empty vehicle and maintain the same in normal position, to be overbalanced by the weight of the load in the vehicle and to automatically return the vehicle and platform to normal position after the discharge of the load.

27. In a dumping apparatus, the combination of a laterally-tilting platform, and a support therefor, said platform being eccentrically pivoted upon said support, means for supporting a vehicle upon the platform so that the weight of the load therein will automatically tilt the platform, a counterbalance suspended from the short side of the platform and adapted to be overbalanced by the weight of the load and to return the platform and empty vehicle to normal position, and means for controlling the tilting of the platform.

In testimony whereof I affix my signature in presence of two witnesses.

RALPH Z. McCOY.

Witnesses:
JOHN L. FLETCHER,
C. C. HINES.